United States Patent
Shaffer

(10) Patent No.: US 7,636,973 B2
(45) Date of Patent: Dec. 29, 2009

(54) CLOTHES WASHER WASH CYCLE METHOD AND APPARATUS

(75) Inventor: Timothy Scott Shaffer, La Grange, KY (US)

(73) Assignee: General Electric Company, Schenectady, NY (US)

( * ) Notice: Subject to any disclaimer, the term of this patent is extended or adjusted under 35 U.S.C. 154(b) by 555 days.

(21) Appl. No.: 10/448,932

(22) Filed: May 30, 2003

(65) Prior Publication Data

US 2004/0237212 A1    Dec. 2, 2004

(51) Int. Cl.
*D06F 33/00* (2006.01)
(52) U.S. Cl. .......................................... 8/159
(58) Field of Classification Search ................ 8/158, 8/159; 68/12.01, 23.3, 23.5, 23.7, 133
See application file for complete search history.

(56) References Cited

U.S. PATENT DOCUMENTS

| | | | |
|---|---|---|---|
| 3,473,351 A * | 10/1969 | Mason | 68/133 |
| 4,303,406 A * | 12/1981 | Ross | 8/158 |
| 4,987,627 A * | 1/1991 | Cur et al. | 8/158 |
| 5,167,722 A | 12/1992 | Pastryk et al. | |
| 5,504,955 A | 4/1996 | Mueller et al. | |
| 5,507,053 A | 4/1996 | Mueller et al. | |
| 5,687,440 A | 11/1997 | Min et al. | |
| 5,692,259 A | 12/1997 | Lee et al. | |
| 5,737,790 A | 4/1998 | Badger et al. | |
| 5,758,377 A | 6/1998 | Cimetta et al. | |
| 5,870,905 A * | 2/1999 | Imamura et al. | 68/12.04 |
| 6,029,298 A | 2/2000 | Dausch et al. | |
| 6,393,643 B1 * | 5/2002 | Wientjens | 8/159 |

* cited by examiner

*Primary Examiner*—Joseph L Perrin
(74) *Attorney, Agent, or Firm*—George L. Rideout, Esq.; Armstrong Teasdale LLP

(57) ABSTRACT

A method for operating a washing machine in a wash cycle is provided. The washing machine includes a rotatable basket disposed in a wash tub and an agitator disposed in the basket. The method includes, in an exemplary embodiment, adding a predetermined amount of wash liquid to the wash tub, oscillating the agitator at a first speed, and oscillating the agitator at a second speed that is greater than the first speed.

23 Claims, 5 Drawing Sheets

CLOTHES WASHER WASH CYCLE METHOD AND APPARATUS

BACKGROUND OF THE INVENTION

This invention relates generally to washing machines, and, more particularly, to methods and apparatus for reducing water consumption in washing machine wash cycles.

Washing machines typically include a cabinet that houses an outer tub for containing wash and rinse water, a perforated clothes basket within the tub, and an agitator within the basket. A drive and motor assembly is mounted underneath the stationary outer tub to rotate the clothes basket and the agitator relative to one another, and a pump assembly pumps water from the tub to a drain to execute a wash cycle. See, for example, U.S. Pat. No. 6,029,298.

In large load capacity washing machines the wash cycles include a deep-fill process wherein articles in the clothes basket are completely submerged in a wash liquid formed from water and a detergent, and the wash liquid is agitated. As such, a large amount of wash liquid is used to wet and clean the clothes. It has become increasingly desirable to reduce water consumption in washing operations. However, decreased water consumption decreases the level of the wash liquid in the machine and does not permit large loads to be properly wetted nor properly agitated during the wash cycle.

BRIEF DESCRIPTION OF THE INVENTION

In one aspect, a method for operating a washing machine in a wash cycle is provided. The washing machine includes a rotatable basket disposed in a wash tub and an agitator disposed in the basket. The method includes adding a predetermined amount of wash liquid to the wash tub, oscillating the agitator at a first speed, and oscillating the agitator at a second speed that is greater than the first speed.

In another aspect, a method of washing clothes in a washing machine is provided. The washing machine includes a rotatable basket disposed in a wash tub and an agitator disposed in the basket. The method includes loading clothes into the basket, adding a predetermined amount of wash liquid to the wash tub, oscillating the agitator at a first speed, and oscillating the agitator at a second speed that is greater than the first speed.

In another aspect, a washing machine is provided that includes a tub, a basket rotatably mounted within the tub, an agitator mounted within the basket, a pump for recirculating a washing liquid, a multi-speed drive system coupled to the basket and the agitator, and a controller operatively coupled to the drive system and the pump. The drive system is configured to oscillate the agitator at a plurality of speeds, and is further configured to rotate the basket at a plurality of speeds. The controller is configured to operate the drive system during the wash cycle to oscillate the agitator at a first speed, and oscillate the agitator at a second speed, the second speed higher than the first speed.

DETAILED DESCRIPTION OF THE INVENTION

Figure 1:
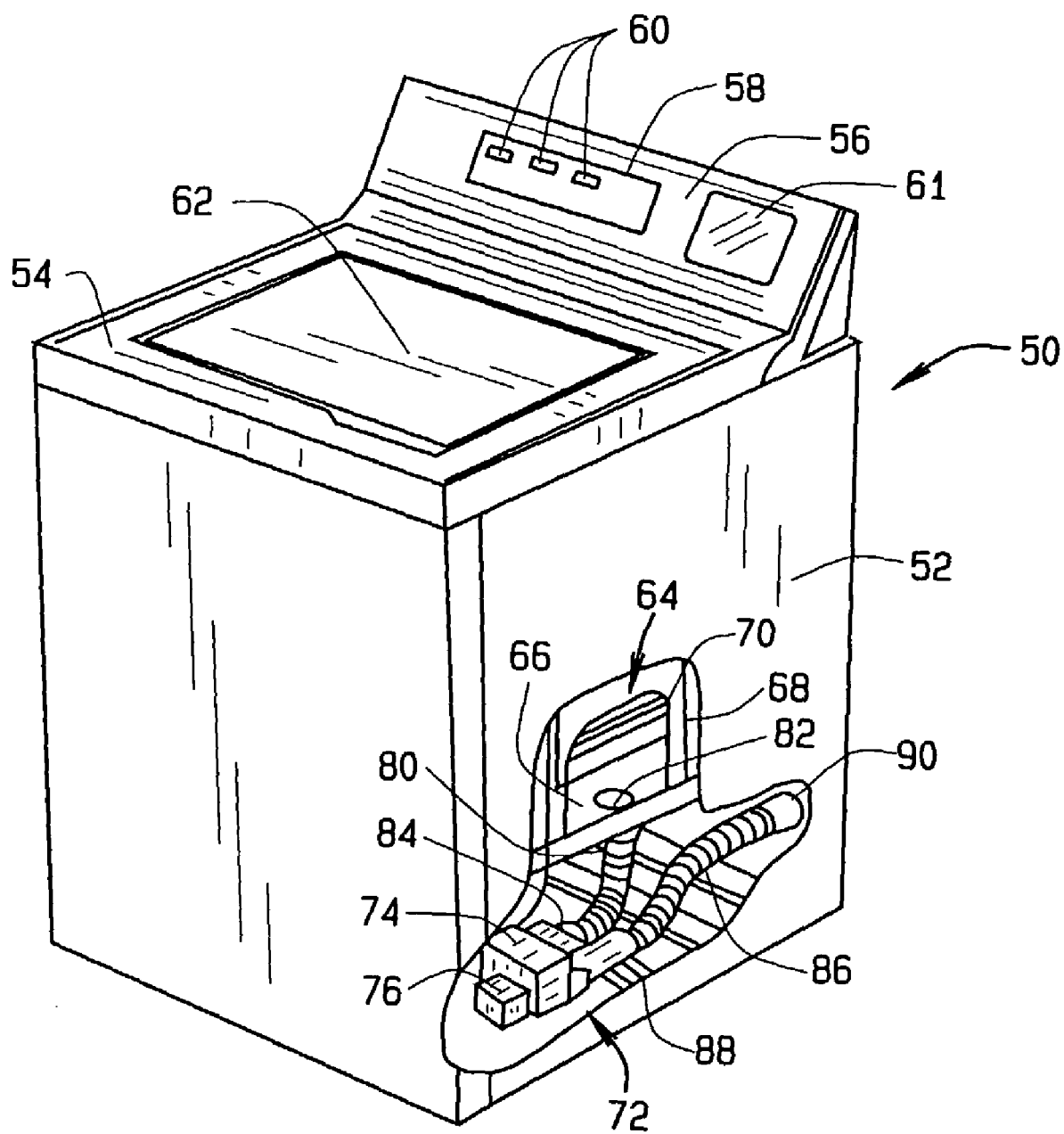
FIG. 1 is a perspective cutaway view of an exemplary washing machine.

FIG. 1 is a perspective view partially broken away of an exemplary washing machine 50 including a cabinet 52 and a cover 54. A backsplash 56 extends from cover 54, and a control panel 58 including a plurality of input selectors 60 is coupled to backsplash 56. Control panel 58 and input selectors 60 collectively form a user interface input for operator selection of machine cycles and features, and in one embodiment a display 61 indicates selected features, a countdown timer, and other items of interest to machine users. A lid 62 is mounted to cover 54 and is rotatable about a hinge (not shown) between an open position (not shown) facilitating access to a wash tub 64 located within cabinet 52, and a closed position (shown in FIG. 1) forming a sealed enclosure over wash tub 64. As illustrated in FIG. 1, machine 50 is a vertical axis washing machine.

Tub 64 includes a bottom wall 66 and a sidewall 68, and a basket 70 is rotatably mounted within wash tub 64. A pump assembly 72 is located beneath tub 64 and basket 70 for gravity assisted flow when draining tub 64. Pump assembly 72 includes a pump 74 and a motor 76. A pump inlet hose 80 extends from a wash tub outlet 82 in tub bottom wall 66 to a pump inlet 84, and a pump outlet hose 86 extends from a pump outlet 88 to an appliance washing machine water outlet 90 and ultimately to a building plumbing system discharge line (not shown) in flow communication with outlet 90.

Figure 2:
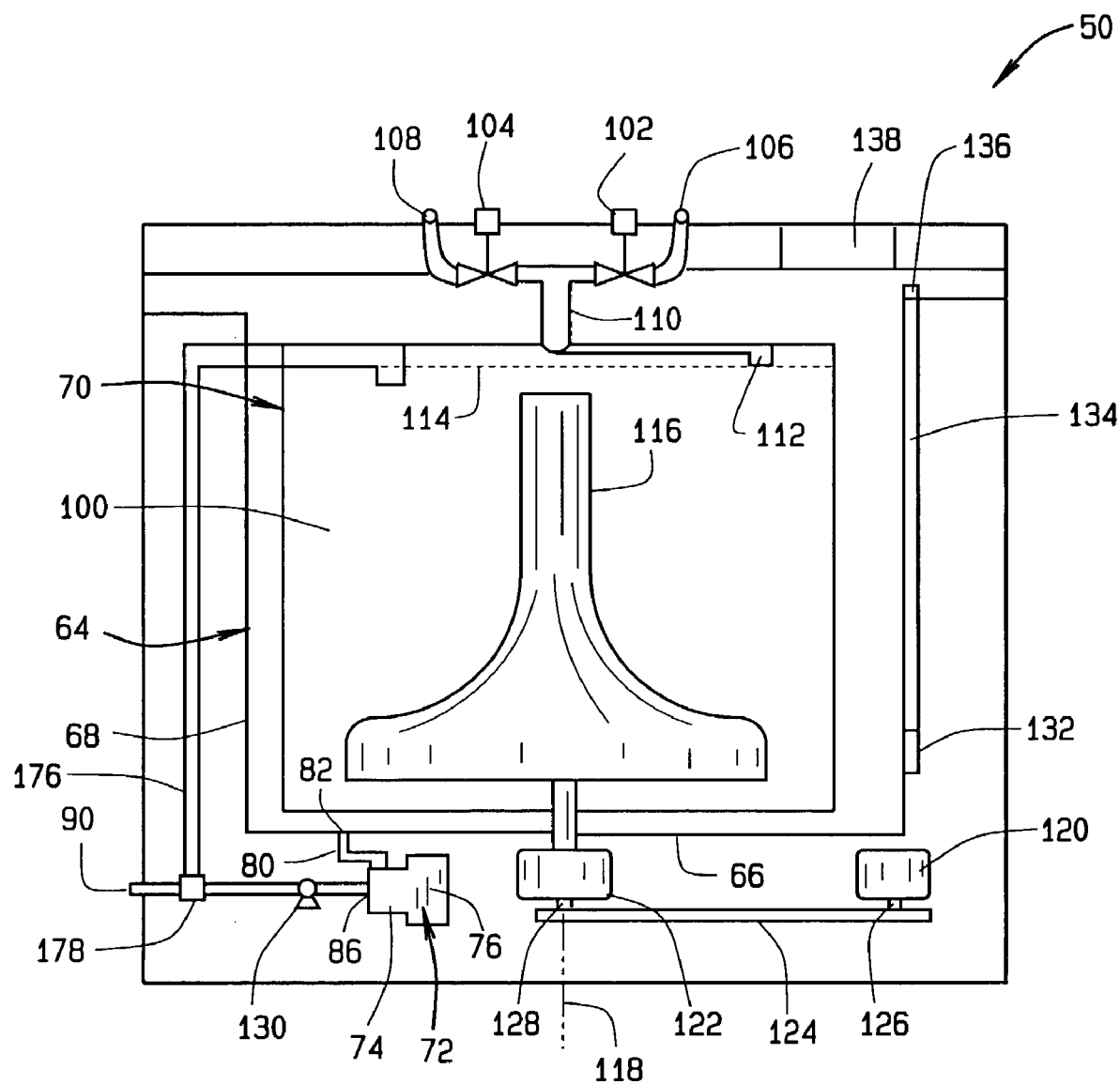
FIG. 2 is front schematic view of the washing machine shown in FIG. 1.

FIG. 2 is a front elevational schematic view of washing machine 50 including wash basket 70 movably disposed and rotatably mounted in wash tub 64 in a spaced apart relationship from tub side wall 64 and tub bottom 66. Basket 12 includes a plurality of perforations therein to facilitate fluid communication between an interior of basket 70 and wash tub 64.

A hot liquid valve 102 and a cold liquid valve 104 deliver fluid, such as water, to basket 70 and wash tub 64 through a respective hot liquid hose 106 and a cold liquid hose 108. Liquid valves 102, 104 and liquid hoses 106, 108 together form a liquid supply connection for washing machine 50 and, when connected to a building plumbing system (not shown), provide a fresh water supply for use in washing machine 50. Liquid valves 102, 104 and liquid hoses 106, 108 are connected to a basket inlet tube 110, and fluid is dispersed from inlet tube 110 through a known nozzle assembly 112 having a number of openings therein to direct washing liquid into basket 70 at a given trajectory and velocity. A known dispenser (not shown in FIG. 2), may also be provided to produce a wash solution by mixing fresh water with a known detergent or other composition for cleansing of articles in basket 70.

In an alternative embodiment, a known spray fill conduit 114 (shown in phantom in FIG. 2) may be employed in lieu of nozzle assembly 112. Along the length of the spray fill conduit 114 are a plurality of openings arranged in a predetermined pattern to direct incoming streams of water in a downward tangential manner towards articles in basket 70. The openings in spray fill conduit 114 are located a predetermined distance apart from one another to produce an overlapping coverage of liquid streams into basket 70. Articles in basket 70 may therefore be uniformly wetted even when basket 70 is maintained in a stationary position.

A known agitation element 116, such as a vane agitator, impeller, auger, or oscillatory basket mechanism, or some combination thereof is disposed in basket 70 to impart an oscillatory motion to articles and liquid in basket 70. In different embodiments, agitation element 116 may be a single action element (i.e., oscillatory only), double action (oscillatory movement at one end, single direction rotation at the other end) or triple action (oscillatory movement plus single direction rotation at one end, singe direction rotation at the other end). As illustrated in FIG. 2, agitation element 116 is oriented to rotate about a vertical axis 118.

Basket 70 and agitator 116 are driven by motor 120 through a transmission and clutch system 122. A transmission belt 124 is coupled to respective pulleys of a motor output shaft 126 and a transmission input shaft 128. Thus, as motor output shaft 126 is rotated, transmission input shaft 128 is also rotated. Clutch system 122 facilitates driving engagement of basket 70 and agitation element 116 for rotatable movement within wash tub 64, and clutch system 122 facilitates relative rotation of basket 70 and agitation element 116 for selected portions of wash cycles. Motor 120, transmission and clutch system 122 and belt 124 collectively are referred herein as a machine drive system.

Washing machine 50 also includes a brake assembly (not shown) selectively applied or released for respectively maintaining basket 70 in a stationary position within tub 64 or for allowing basket 70 to spin within tub 64. Pump assembly 72 is selectively activated, in the example embodiment, to remove liquid from basket 70 and tub 64 through drain outlet 90 and a drain valve 130 during appropriate points in washing cycles as machine 50 is used. In an exemplary embodiment, machine 50 also includes a reservoir 132, a tube 134 and a pressure sensor 136. As fluid levels rise in wash tub 64, air is trapped in reservoir 132 creating a pressure in tube 134 that pressure sensor 136 monitors. Liquid levels, and more specifically, changes in liquid levels in wash tub 64 may therefore be sensed, for example, to indicate laundry loads and to facilitate associated control decisions. In further and alternative embodiments, load size and cycle effectiveness may be determined or evaluated using other known indicia, such as motor spin, torque, load weight, motor current, and voltage or current phase shifts.

Operation of machine 50 is controlled by a controller 138 which is operatively coupled to the user interface input located on washing machine backsplash 56 (shown in FIG. 1) for user manipulation to select washing machine cycles and features. In response to user manipulation of the user interface input, controller 138 operates the various components of machine 50 to execute selected machine cycles and features.

Figure 3:
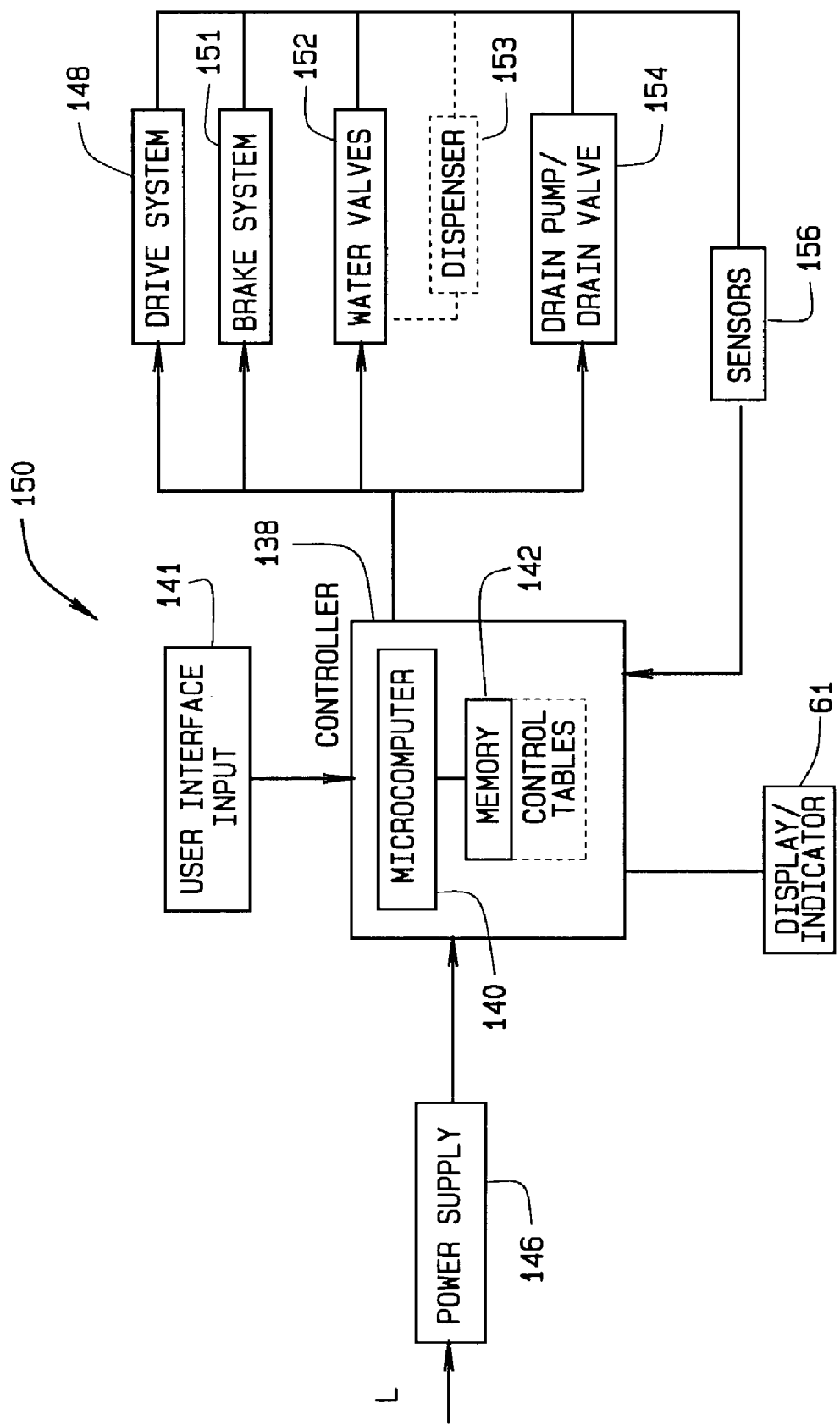
FIG. 3 is a schematic block diagram of a control system for the washing machine shown in FIGS. 1 and 2.

FIG. 3 is a schematic block diagram of an exemplary washing machine control system 150 for use with washing machine 50 (shown in FIGS. 1 and 2). Control system 150 includes controller 138 which may, for example, be a microcomputer 140 coupled to a user interface input 141. An operator may enter instructions or select desired washing machine cycles and features via user interface input 141, such as through input selectors 60 (shown in FIG. 1) and a display or indicator 61 coupled to microcomputer 140 displays appropriate messages and/or indicators, such as a timer, and other known items of interest to washing machine users. A memory 142 is also coupled to microcomputer 140 and stores instructions, calibration constants, and other information as required to satisfactorily complete a selected wash cycle. Memory 142 may, for example, be a random access memory (RAM). In alternative embodiments, other forms of memory could be used in conjunction with RAM memory, including but not limited to flash memory (FLASH), programmable read only memory (PROM), and electronically erasable programmable read only memory (EEPROM).

Power to control system 150 is supplied to controller 138 by a power supply 146 configured to be coupled to a power line L. Analog to digital and digital to analog converters (not shown) are coupled to controller 138 to implement controller inputs and executable instructions to generate controller output to washing machine components such as those described above in relation to FIGS. 1 and 2. More specifically, controller 138 is operatively coupled to machine drive system 148 (e.g., motor 120, clutch system 122, and agitation element 116 shown in FIG. 2), a brake assembly 151 associated with basket 70 (shown in FIG. 2), machine water valves 152 (e.g., valves 102, 104 shown in FIG. 2) and machine drain system 154 (e.g., drain pump assembly 72 and/or drain valve 130 shown in FIG. 2) according to known methods. In a further embodiment, water valves 152 are in flow communication with a dispenser 153 (shown in phantom in FIG. 3) so that water may be mixed with detergent or other composition of benefit to washing of garments in wash basket 70.

In response to manipulation of user interface input 141 controller 138 monitors various operational factors of washing machine 50 with one or more sensors or transducers 156, and controller 138 executes operator selected functions and features according to known methods. Of course, controller 138 may be used to control washing machine system elements and to execute functions beyond those specifically described herein. Controller 138 operates the various components of washing machine 50 in a designated wash cycle familiar to those in the art of washing machines.

Figure 4:
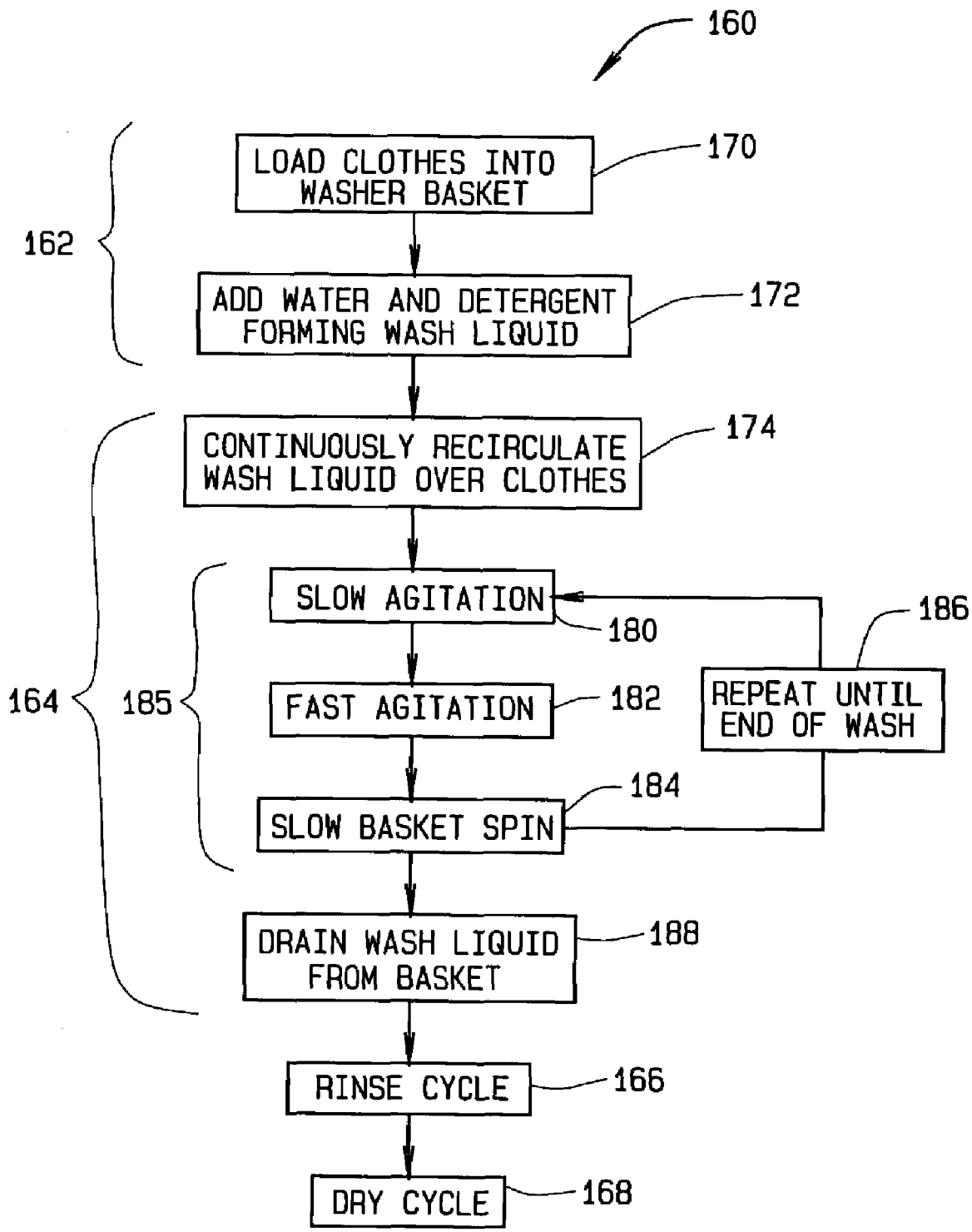
FIG. 4 is a process diagram illustrating process steps for a method of washing clothes.

FIG. 4 is a process diagram that illustrates a method 160 for washing clothes in washing machine 50. In an exemplary embodiment, method 160 includes a load cycle 162, a wash cycle 164, a rinse cycle 166, and a dry cycle 168.

Load cycle 162 includes loading 170 clothes into basket 70 and adding 172 water and detergent to form a wash liquid. The water is added to tub 64 and mixed with detergent to form the wash fluid. Washing operation is initiated through operator manipulation of control input selectors 60 (shown in FIG. 1).

Wash cycle 164 includes continuously recirculating 174 the wash liquid over the clothes in basket 70 throughout wash cycle 164. Referring also to FIG. 2, the wash liquid can be recirculated by pump assembly 72 via a recirculation line 176 connected to pump outlet hose 86 by recirculation valve 178. In an alternate embodiment a separate recirculation pump is used to pump wash liquid through recirculation line 176 and back into tub 64.

Figure 5:
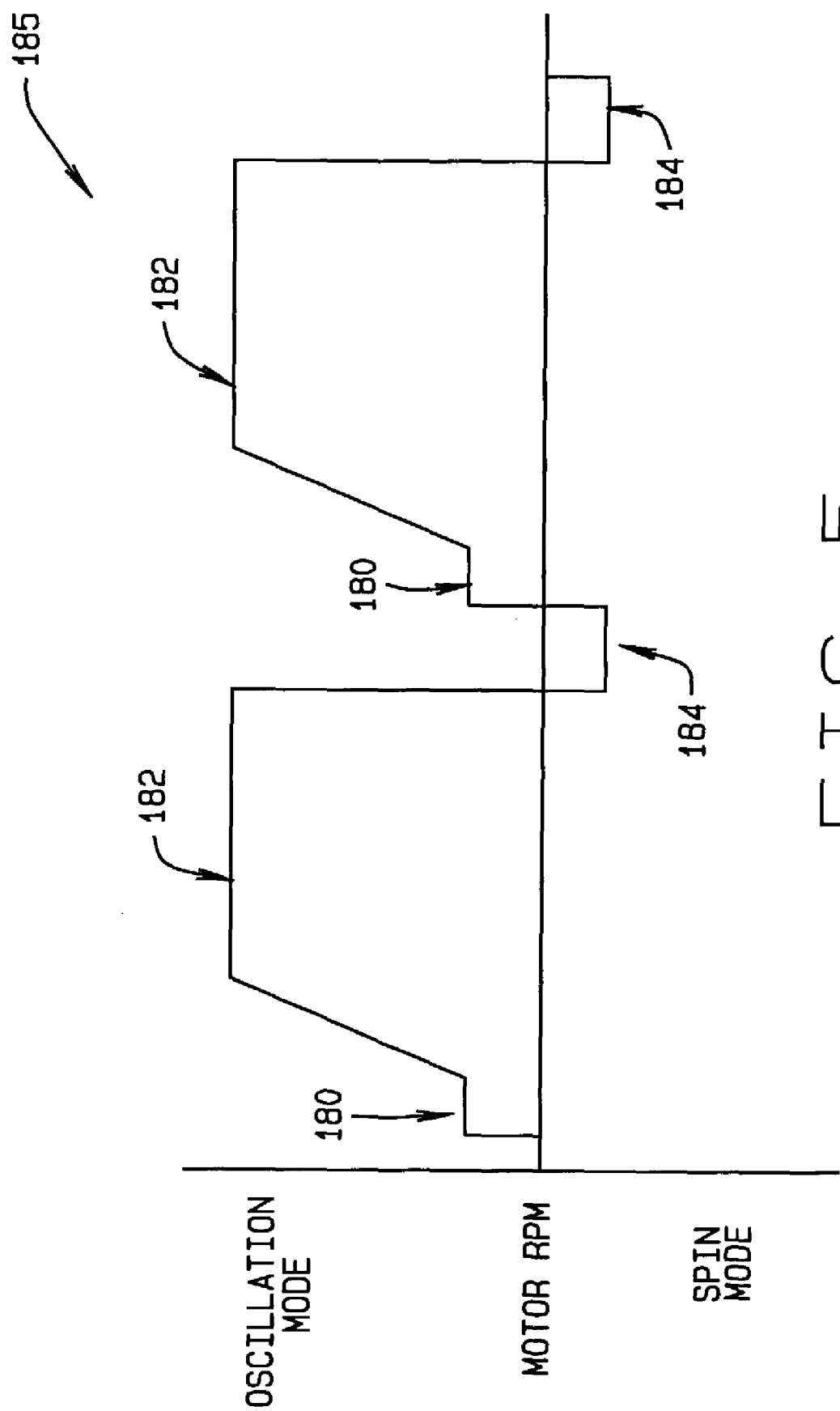
FIG. 5 is a graphical representation of the wash cycle.

Wash cycle 164 also includes slow agitation 180 for a first predetermined time period with agitation element 116 for cleansing of clothes in basket 70. That is, agitation element is moved back and forth in an oscillatory back and forth motion. In the illustrated embodiment, agitation element 116 is rotated clockwise a specified amount about the vertical axis of the machine, and then rotated counterclockwise by a specified amount. The clockwise/counterclockwise reciprocating motion is sometimes referred to as a stroke, and the agitation phase of the wash cycle constitutes a number of strokes in sequence. For slow agitation 180, the agitator is oscillated at about 10 to about 160 strokes per minute Acceleration and deceleration of agitation element 116 during the strokes imparts mechanical energy to articles in basket 70 for cleansing action. The strokes may be obtained in different embodiments with a reversing motor, a reversible clutch, or other known reciprocating mechanism. Wash cycle 164 also includes fast agitation 182 for a second predetermined time period, and a slow basket spin 184 for a third predetermined time period. Although the fast agitation stroke also assists in the cleansing action to articles in basket 70, its principal purpose is to quickly impart enough energy into the clothes articles to rotate them within the wash liquid. This rotation of articles acts to even out the cleansing action across all articles and sides of the articles. The magnitude of the fast agitation stroke is a function of water level, article type, and article quantity. For fast agitation 182, the agitator is oscillated at about 50 to about 210 strokes per minute. The steps of slow agitation 180, fast agitation 182, and slow basket spin 184 form a sub-cycle 185 that is repeated 186 until the end of wash cycle 164. Before slow basket spin 184, fast agitation 182 is terminated, and before slow agitation 180, slow basket spin 184 is terminated. See FIG. 5 for a graphical representation of sub-cycle 185. By slow basket spin is meant rotating basket 70 at a speed that is less than the rotational speed of basket 70 during the spin dry cycle. In one embodiment, for example, slow basket spin is less than about 175 revolutions per minute, in another embodiment, slow basket spin is less than about 100 revolutions per minute, and in another embodiment, slow basket spin is about 70 revolutions per minute.

At the conclusion of wash cycle 164, the wash liquid is drained 188 from wash tub 64. The clothes are then rinsed in rinse cycle 166 to remove any residual detergent and then the clothes are then spin dried in dry cycle 168.

In an alternate embodiment, wash cycle 164 does not include continuously recirculating wash liquid over the clothes in basket 70. Instead, wash cycle 164 includes sub-cycle 185 that includes slow agitation 180 for a first predetermined time period, fast agitation 182 for a second predetermined time period, and slow basket spin 184 for a third time period. Sub-cycle 185 is continuously repeated until the end of wash cycle 164.

In a further alternate example, wash cycle 164 does not include continuously recirculating wash liquid over the clothes in basket 70 and sub-cycle 185 does not include a slow basket spin. Instead, Instead, wash cycle 164 includes sub-cycle 185 that includes slow agitation 180 for a first predetermined time period and fast agitation 182 for a second predetermined time period. Sub-cycle 185 is continuously repeated until the end of wash cycle 164.

The above described method 160 permits proper wetting and agitation of large loads during wash cycle 164 at reduced water usage. Method 160 combines agitation, basket spin, and continuous wash liquid recirculation to promote wetting of the clothes, mechanical action of detergent into the clothes, and rapid flow of wash liquid through the clothes in washing machine 50.

While the invention has been described in terms of various specific embodiments, those skilled in the art will recognize that the invention can be practiced with modification within the spirit and scope of the claims.

What is claimed is:

1. A method for operating a washing machine in a wash cycle, the washing machine comprising a rotatable basket disposed in a wash tub and an agitator disposed in the basket, said method comprising:
   adding a predetermined amount of wash liquid to the wash tub;
   oscillating the agitator in an oscillatory back and forth motion at a first oscillation frequency for a first predetermined time interval, wherein the oscillatory back and forth motion comprises rotating the agitator clockwise a specified amount about a vertical axis of the washing machine then rotating the agitator counterclockwise a specified amount about the vertical axis of the washing machine;
   oscillating the agitator in the oscillatory back and forth motion at a second oscillation frequency for a second predetermined time interval, wherein the second oscillation frequency is greater than the first oscillation frequency;
   rotating the basket at a first rotational speed for a third predetermined time interval, wherein a sub-cycle of the wash cycle comprises said oscillating at the first oscillation frequency, said oscillating at the second oscillation frequency, and said rotating;
   continuously directing recirculated wash liquid into the basket; and
   repeating the sub-cycle a series of times during the wash cycle, wherein the wash cycle is performed prior to a rinse cycle and dry cycle.

2. A method in accordance with claim 1 further comprising continuously repeating the sub-cycles during the wash cycle.

3. A method in accordance with claim 1 further comprising rotating the basket at a second rotational speed for spin drying clothes in the basket during a dry cycle.

4. A method in accordance with claim 3 wherein the first rotational speed is less than the second rotational speed.

5. A method in accordance with claim 4 further comprising terminating rotating the basket before repeating oscillating the agitator at the first oscillation frequency.

6. A method in accordance with claim 3 further comprising terminating oscillating the agitator at the second oscillation frequency before rotating the basket.

7. A method in accordance with claim 4 further comprising continuously directing recirculated wash liquid into the basket.

8. A method in accordance with claim 3 wherein rotating the basket comprises rotating the basket around a vertical axis.

9. A method in accordance with claim 1 wherein the predetermined amount of wash liquid is a function of a load size.

10. A method in accordance with claim 1 wherein the predetermined amount of wash liquid is a function of a load type.

11. A method in accordance with claim 1 wherein the first oscillation frequency is in the range of about 10 to about 160 strokes per minute.

12. A method in accordance with claim 1 wherein the second oscillation frequency is in the range of about 50 to about 210 strokes per minute.

13. A method of washing clothes in a washing machine, the washing machine comprising a rotatable basket disposed in a wash tub and an agitator disposed in the basket, said method comprising:
   loading clothes into the basket;
   adding a predetermined amount of wash liquid to the wash tub;
   oscillating the agitator in an oscillatory back and forth motion at a first oscillation frequency for a first predetermined time interval, wherein the oscillatory back and forth motion comprises rotating the agitator clockwise a specified amount about a vertical axis of the washing machine then rotating the agitator counterclockwise a specified amount about the vertical axis of the washing machine;
   oscillating the agitator in the oscillatory back and forth motion at a second oscillation frequency for a second predetermined time interval, wherein the second oscillation frequency is greater than the first oscillation frequency;
   rotating the basket at a first rotational speed for a third predetermined time interval, wherein a sub-cycle of a wash cycle comprises said oscillating at the first oscillation frequency, said oscillating at the second oscillation frequency, and said rotating;
   continuously directing recirculated wash liquid into the basket; and repeating the sub-cycle a series of times during the wash cycle, wherein the wash cycle is performed prior to a rinse cycle and dry cycle.

14. A method in accordance with claim 13 further comprising draining the wash liquid froth the wash tub in the wash cycle and rinsing the clothes in the rinsing cycle.

15. A method in accordance with claim 13 further comprising continuously repeating said sub-cycles.

16. A method in accordance with claim 13 further comprising rotating the basket at a second rotational speed during a dry cycle.

17. A method in accordance with claim 16 wherein the first rotational speed is less than the second rotational speed.

18. A method in accordance with claim 17 further comprising terminating rotating the basket before repeating oscillating the agitator at the first oscillation frequency.

19. A method in accordance with claim 17 further comprising continuously directing recirculated wash liquid into the basket for a predetermined time.

20. A method in accordance with claim 16 further comprising terminating oscillating the agitator at the second oscillation frequency before rotating the basket.

21. A method in accordance with claim 16 wherein rotating the basket comprises rotating the basket around a vertical axis.

22. A method in accordance with claim 13 wherein the first oscillation frequency is in the range of about 10 to about 160 strokes per minute.

23. A method in accordance with claim 13 wherein the second oscillation frequency is in the range of about 50 to about 210 strokes per minute.

* * * * *